United States Patent [19]

Jonner

[11] 4,059,312
[45] Nov. 22, 1977

[54] ANTI-LOCKING CONTROL SYSTEM

[75] Inventor: Wolf-Dieter Jonner, Sandhausen, Germany

[73] Assignee: Teldix GmbH, Heidelberg, Germany

[21] Appl. No.: 726,276

[22] Filed: Sept. 24, 1976

[30] Foreign Application Priority Data

Sept. 27, 1975 Germany ............................ 2543178

[51] Int. Cl.² .............................................. B60T 8/00
[52] U.S. Cl. ...................................... 303/92; 303/96; 303/111
[58] Field of Search .................... 303/92, 111, 96, 106

[56] References Cited

U.S. PATENT DOCUMENTS

| 3,740,103 | 6/1973 | Sweet | 303/92 |
| 3,797,893 | 3/1974 | Burckhardt | 303/92 |
| 3,866,979 | 2/1975 | Rabus | 303/92 |
| 3,866,981 | 2/1975 | Klatt | 303/111 |
| 3,930,687 | 1/1976 | Amand | 303/92 |

Primary Examiner—Trygve M. Blix
Assistant Examiner—Reinhard J. Eisenzopf
Attorney, Agent, or Firm—Spencer & Kaye

[57] ABSTRACT

In an anti-locking brake control system in which two wheels on the same axle have their brakes individually controlled via individual brake pressure control devices, and which includes a monitoring system for interrupting the control operation of a control device whenever that device has responded to a control signal for more than a predetermined time period, a switching arrangement is provided which, whenever the control device for one wheel on the axle has responded for longer than the predetermined time period, connects that control device to receive the associated control signals destined for the control device for the other wheel on that axle.

7 Claims, 1 Drawing Figure

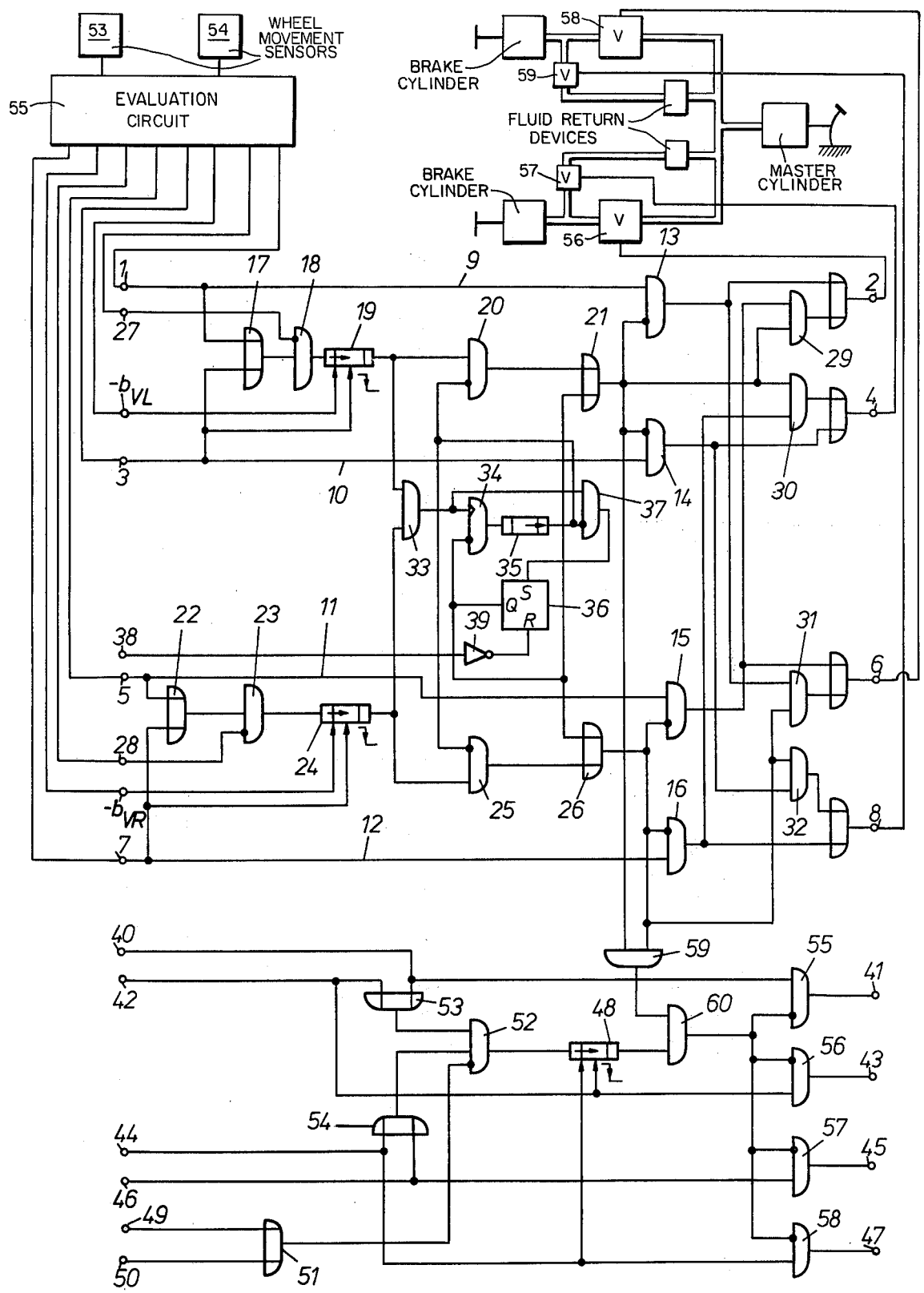

ANTI-LOCKING CONTROL SYSTEM

BACKGROUND OF THE INVENTION

The present invention relates to an anti-locking control system of the type supplying separately regulated brake pressures to wheels on the same axle.

A system of the type to which the invention is directed includes sensors to measure the velocity or acceleration of these wheels and to generate corresponding signals, an evaluation circuit for processing these signals and generating control signals, brake pressure control devices receiving these control signals for the separate regulation of the brake pressures, and a monitoring device which separately monitors the response periods of the brake pressure control devices and, when a response period by one of the brake pressure control devices is exceeded, interrupts its control operation so that both brake pressure control devices are then operated in the same manner.

An anti-locking control system with such a monitoring device is disclosed in U.S. Pat. No. 3,883,184. In the monitoring device disclosed in that patent, the response period of the inlet valve and/or the outlet valve is monitored with the aid of a timer and if a valve being monitored has responded for too long a period of time, a signal is generated which then makes ineffective the control operation at the wheels of that axle and instead actuates, for a given second period of time, a control operation which creates alternating pressure build-ups and reductions. If the control signal continues to be present even after the period of controlled operation, the controller is permanently switched off. The actuation of the control operation before disconnection of the controller may be made dependent on the presence of certain wheel behavior factors, e.g., the presence of slip.

According to another solution described in the above-mentioned U.S. patent, the controller is normally switched off at the end of the response period unless signals derived from the wheels indicate that road conditions are the cause of the extended response period. If such signals are present, the response period is extended to another given value and only if the control signal for the brake pressure regulator is still present at the end of that period is the controller switched off and the system changed to normal brake operation.

This monitoring device does present significant advantages over a device which switches off after a fixed, given time, in that unnecessary switching off under different road conditions is avoided.

SUMMARY OF THE INVENTION

It is an object of the present invention to further improve devices of the above-described type by causing brake pressure regulation to be maintained as long as the brake pressure regulators of both wheels of the axle do not respond for too long a period of time.

This is accomplished, according to the invention, by switching means which, at the end of the first response period of the one brake pressure regulator, establish a connection for supplying the control signals destined for the other brake pressure regulator to the corresponding inputs of the one brake pressure regulator.

In a system according to the present invention, which, however, requires separate brake pressure regulation for the wheels of one axle, one brake pressure regulating member is connected in parallel with another brake pressure regulating member if the first brake pressure regulating member responds for too long a period of time, possibly due to a fault in the system, so that the brake pressure to this wheel is regulated on the basis of the movement behavior of the other wheel on the same axle. This mode of regulation is maintained until, as a result of a change in the movement behavior of the wheel whose brake pressure regulator had responded for too long a period of time, the extended control signal ends and the regulation begins anew according to the signals of the associated wheel.

The waiting period to determine whether "independent control" begins anew need not be limited here since intermediate regulation also takes place.

According to a further feature of the invention, the control system is permanently switched off if both brake pressure regulators respond for too long a period of time in an overlapping manner and the first waiting period has expired. In this case, the above-described system establishes a second waiting period when the response time is exceeded by the second regulator which has been active too long. During this second waiting period, the control signals from both regulating circuits are effective and, at the end of this second waiting period, both regulating circuits are switched off. For this purpose, a signal is generated and a memory is enabled whose output signal permanently interrupts the control operation.

This interruption can be eliminated, for example, only at the end of the braking operation, e.g., by the opening of the brake light switch. A condition under which the regulators for both brakes respond for a period longer than the monitoring period may occur when there is a coefficient of friction jump on both sides, during hydroplaning, or when the coefficient of friction on both sides is insufficient. Then the second waiting period becomes effective during which the control signals remain effective. Only during hydroplaning can it happen that the waiting period is not sufficient and the regulation in both circuits is switched off. Then it is of advantage that the regulation is switched off when roadway conditions improve and the front wheels have locked since then the accidentally sideways directed steered wheels will have a less disadvantageous influence on the driving behavior.

Preferably, the control system is permanently switched off if a control signal continues over a very long period of time, e.g., 20 seconds. Then it can no longer be a question of hydroplaning, and it must be assumed that a malfunction exists. If, however, control signals are present for both regulators of one axle, there should not be a malfunction and the 20-second period must not begin. Therefore, the signals for blocking the regulation and parallel connection are connected with a 20-second timer via Exclusive-OR gates so that only the presence of a signal can start the timer and thus actuate the later final blockage.

As already mentioned, the thus monitored brake pressure control devices are preferably associated with the steered vehicle wheels and at least one further brake pressure control device is provided for the rear wheels, which further device may also be associated with a monitoring timer which generates a signal when a given response period has been exceeded. In the present case, this signal may interrupt the regulation of the brake pressure at the rear wheels and thus produce locking only if the controller has already been switched off at both front wheels and thus these wheels are locked.

Most favorably, the measurement of the response period is interrupted and the measuring begun anew if the wheel in question experiences a deceleration. Likewise, when there is being used a valve arrangement having "increase pressure", "decrease pressure" and "maintain pressure" positions, an interruption of the measuring period will be provided at the end of the pressure reduction period so that it will not happen that a pressure reduction period and subsequent pressure maintaining period are added to form a measured period. Moreover, it is favorable to suppress measurement of the response period if a wheel acceleration signal is derived from the associated wheel.

BRIEF DESCRIPTION OF THE DRAWING

The sole FIGURE is a schematic circuit diagram of a preferred embodiment of a controller according to the invention.

DESCRIPTION OF THE PREFERRED EMBODIMENTS

The FIGURE shows the details of only the part of the anti-locking controller which is connected between the output of an evaluation circuit 55 and the brake pressure regulating devices, the latter here being designed as valve arrangements having the functions of an inlet valve and an outlet valve.

In the embodiment illustrated in the FIGURE, input terminal 1 is provided to receive the output from the evaluation circuit to control the inlet valve 56 of the left front wheel, which is connected to output 2. The outlet valve 57 of the left front wheel is connected to the output 4 to receive control signals delivered to terminal 3. Terminals 5, 6, 7 and 8 are associated with the right front wheel and correspond to terminals 1, 2, 3 and 4, respectively. The inlet valve 58 for the right front wheel is connected to output 6 and the outlet valve 59 for that wheel is connected to output 8. The wheels are provided with acceleration sensors 53 and 54 connected to deliver left wheel and right wheel acceleration signals to input terminals 27 and 28, respectively.

To control the individual valves, signals are conducted via lines 9, 10, 11 and 12. The AND gates 13, 14, 15 and 16 connected in these lines are normally conductive for passing the control signals.

Each wheel brake has associated with it a monitoring device. The monitoring device for the left front wheel brake includes an OR gate 17, AND gate 18, timing, or delay, member 19, series-connected AND gate 20, and OR gate 21. Correspondingly, the monitoring device for the right front wheel brake includes OR gate 22, AND gate 23, timing member 24, series-connected AND gate 25, and OR gate 26.

The operation of the illustrated circuit will now be described, it being initially assumed that none of the wheels exhibits a significant wheel acceleration so that no acceleration signals from the corresponding wheels are present at terminal 27 or 28. Thus, gates 18 and 23 remain enabled and the control signals applied to inputs 1, 3, 5 and 7 for controlling the valves reach inputs of timer 19 and 24, respectively. If, for example, the outlet valve which is connected to terminal 4 is continuously actuated, due to the presence of a signal at terminal 3, for a period of time which is longer than the time delay of timing member 19, which is 150 msec, for example, the timing member 19 emits a signal at the end of this period and this signal is conducted via the normally conducting AND gate 20 and OR gate 21 to the inverting inputs of AND gates 13 and 14 to cause those gates to be blocked, or nonconducting. As a result, the valves connected to terminals 2 and 4 are isolated from their control signals.

As long as gate 20 remains conducting, the output signal from timing member 19 simultaneously also enables gates 29 and 30 to pass the output signals from AND gates 15 and 16, respectively, i.e., the control signals for the valves of the right front wheel brake. Thus, the valves for the left front wheel, connected to terminals 2 and 4, are acted on by the control signals derived for the right front wheel and intended for the valves connected to terminals 6 and 8, i.e., the corresponding valves of both front wheels are regulated identically, in parallel.

Correspondingly, if the valve connected to terminal 6 or 8 were to respond for too long a period of time, the normal control channels for the valves connected to terminals 6 and 8 would be blocked by application of the output signal from timer 24 via gates 25 and 26 to the inverting inputs of gates 15 and 16 to disable those gates, and to AND gates 31 and 32 to enable those gates and thus connect the valves of the right front wheel to the control channels of the left front wheel.

Once the extended control signal ends, the output signal from timing member 19 or 24 also disappears and the system returns to individual channel regulation.

If an extended control signal appears simultaneously in both channels, the control system is switched off after a given period of time, e.g., 1.5 seconds. For this purpose, the circuit includes an AND gate 33 which produces an output signal upon the occurrence of output signals from both timing members 19 and 24. The leading edge of this output signal temporarily enables a dynamic AND gate 34 so that timer 35 is supplied with an input short signal and produces an output signal having a duration which corresponds to its time interval, e.g., 1.5 sec. At the end of this period, AND gate 37 is enabled due to its inverted input and its output signal sets bistable member 36, which then produces a binary "1" at its Q output to permanently block AND gates 13 to 16, and to block gate 34 in order to prevent transmission of a new setting pulse.

At the beginning of the output signal from timer 35, AND gates 20 and 25 are blocked and these gates remain blocked for the period of that output signal so that, upon the simultaneous occurrence of output signals at timing members 19 and 24, the valves are operatively connected to receive the corresponding control signals for the given period of time defined by the delay of timer 35, i.e., the control system operates for that period.

Resetting of bistable member 36 takes place at the end of the braking period under the influence of the trailing edge of the brake light switch pulse, applied from input 38 via inverter 39 to the reset input of member 36. It should also be mentioned that timing members 19 and 24 are reset by the trailing edges of occuring deceleration signals $-b_{vL}$ or $-b_{vr}$, respectively, and by the trailing edge of the control signal for the associated outlet valve, i.e., the measurements begin anew after such a signal.

The outputs of OR gates 21 and 26 are preferably connected via an Exclusive-OR gate to a further timer having a long time interval so that, after a waiting period of, for example, 20 seconds, the regulation is permanently switched off and a warning signal is delivered to the vehicle operator.

The FIGURE also shows the connections for the control lines for the rear wheels, the control signals therefor being supplied to inputs 40, 42, 44 and 46. The inlet valves of the rear wheel brakes are connected to outputs 41 and 45, and the outlet valves are connected to outputs 43 and 47.

These rear wheel valves have a monitoring timer 48 in common which is controlled by the control signals for the valves via OR gates 53 and 54 and AND gate 52, except during the occurrence of acceleration signals $+b_{HL}$ and $+b_{HR}$, applied to terminals 49 and 50, respectively, and supplied to OR gate 51 and whose output is connected to an inverting input of AND gate 52 and produces an output signal after a control signal has continued, for example, for 300 msec. The timer 48 is here reset each time by the trailing edge of a control signal for either one of the outlet valves.

The output signal of timer 48 can block regulation of the valves by disabling AND gates 55 and 58 only if the control of both front wheel channels is blocked, in which case, AND gate 60 becomes enabled by the output signal from AND gate 59 and can conduct the output signal of timer 48. Thus, it is assured that the wheels will not lock as a result of the rear wheel control system having been switched off before cessation of the control operation becomes effective at the front wheels, i.e., the front wheels will also lock.

In a complete control system according to the invention, use can be made of evaluation circuits, wheel acceleration sensors and brake control devices of the type disclosed in U.S. Pat. No. 3,883,184.

It will be understood that the above description of the present invention is susceptible to various modifications, changes and adaptations, and the same are intended to be comprehended within the meaning and range of equivalents of the appended claims.

What is claimed is:

1. In an anti-locking control system for independently regulating the brake pressure to the brakes of two wheels on one axle, which system includes wheel movement sensors for determining the movement behavior of each of these wheels and for generating corresponding signals, an evaluation circuit connected to process these signals and to generate control signals, two brake pressure control devices each arranged to receive these control signals for the individual regulation of the brake pressure at a respective one of the two wheel brakes, and a monitoring device which independently monitors the response periods of the brake pressure control devices and interrupts their regulation when a predetermined response period is exceeded by the one of the brake pressure control device, to thereafter cause both brake pressure control devices to be influenced identically, the improvement wherein said monitoring device comprises first switching means connected to respond when the response time of one brake pressure control device exceeds the predetermined period for supplying the control signals destined for the other brake pressure control device to the corresponding inputs of the first brake pressure control device, and second switching means including: a timer connected to be actuated, to produce an output signal having a preselected duration, when both brake pressure control devices have responded for longer than the predetermined response period; and means connected to the output of said timer for causing the control signals generated by the evaluation circuit to be applied to their respective control devices for the preselected duration of the output signal from said timer and for blocking the delivery of control signals to the brake pressure control device after termination of the output signal from said timer.

2. An arrangement as defined in claim 1, wherein said monitoring device further comprises third switching means connected to be actuated by the end of a braking operation for then cancelling the blocking effected by said second switching means with respect to both brake pressure control devices upon disappearance of the associated control signals.

3. An arrangement as defined in claim 1, wherein the two brake pressure control devices are associated with respective steered wheels on the front axle of a vehicle and control signals are generated for at least one further brake pressure control device provided for the rear wheels of the vehicle.

4. An arrangement as defined in claim 3, wherein said monitoring device further comprises a timing member connected for emitting a signal when the response time of the further brake pressure control device has exceeded a predetermined response period, and means connected to said timing member and to said first switching means for blocking delivery of control signals to the further brake pressure control device only if said timing member is emitting a signal and the delivery of control signals to the two brake pressure control devices associated with the two steered wheels is being blocked.

5. An arrangement as defined in claim 1, wherein said monitoring device further comprises additional switching means connected for responding to the occurrence of a wheel deceleration signal in order to restart monitoring of the response time of the associated brake pressure control device.

6. An arrangement as defined in claim 1, wherein one of the brake pressure control devices is arranged to selectively permit an increase in brake pressure, a decrease in brake pressure, or maintenance of constant brake pressure, and said monitoring device further comprises supplemental switching means connected for restarting monitoring of the response time of the control device at the end of the pressure decrease phase.

7. An arrangement as defined in claim 1, wherein said monitoring device further comprises further switching means connected for preventing suppression of the monitoring of the response period of a brake pressure control device as long as a wheel acceleration signal is being derived from the associated wheel.

* * * * *